US009069552B2

(12) United States Patent
Hiraguchi et al.

(10) Patent No.: US 9,069,552 B2
(45) Date of Patent: Jun. 30, 2015

(54) IMAGE FORMING APPARATUS HAVING PLURALITY OF POWER SUPPLIES TO CONTROL POWER PROVIDED FROM A COMMERCIAL POWER SUPPLY

(75) Inventors: Hiroshi Hiraguchi, Toyokawa (JP); Takashi Hasebe, Sagamihara (JP); Tomonobu Tamura, Toyokawa (JP); Mineo Yamamoto, Toyokawa (JP); Yuhei Tatsumoto, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 319 days.

(21) Appl. No.: 13/602,934

(22) Filed: Sep. 4, 2012

(65) Prior Publication Data
US 2013/0073879 A1    Mar. 21, 2013

(30) Foreign Application Priority Data

Sep. 15, 2011    (JP) .................................. 2011-201706

(51) Int. Cl.
*G06F 1/00* (2006.01)
*G06F 1/32* (2006.01)

(52) U.S. Cl.
CPC ............ *G06F 1/3284* (2013.01); *G06F 1/3203* (2013.01); *Y02B 60/1267* (2013.01); *Y02B 60/32* (2013.01)

(58) Field of Classification Search
CPC .................................................... G06F 1/3203
See application file for complete search history.

(56) References Cited

U.S. PATENT DOCUMENTS

| 2004/0232878 | A1* | 11/2004 | Couch et al. ................... 320/101 |
| 2005/0045225 | A1* | 3/2005 | Sekine ........................... 136/291 |
| 2006/0099003 | A1 | 5/2006 | Namiki |

(Continued)

FOREIGN PATENT DOCUMENTS

| CN | 101765956 A | 6/2010 |
| CN | 101859082 A | 10/2010 |

(Continued)

OTHER PUBLICATIONS

Office Action (Notice of Grounds of Rejection) issued on Nov. 5, 2013, by the Japanese Patent Office in corresponding Japanese Patent Application No. 2011-201706, and an English Translation of the Office Action. (5 pages).

(Continued)

*Primary Examiner* — Jaweed A Abbaszadeh
*Assistant Examiner* — Gayathri Sampath
(74) *Attorney, Agent, or Firm* — Buchanan Ingersoll & Rooney PC

(57) ABSTRACT

An image forming apparatus includes a functional unit, a first power supply circuit supplying electric power to the functional unit from a commercial power supply, a second power supply circuit including a self-generation power supply, and a third power supply circuit including a power storage unit storing electric power and a charging circuit charging the power storage unit upon receipt of supply of electric power from at least one of the commercial power supply and the self-generation power supply. In accordance with the amount of power supply from the self-generation power supply, higher priority is given to supply of electric power to the functional unit from at least one of the second and third power supply circuits than to supply of electric power from the first power supply circuit.

10 Claims, 7 Drawing Sheets

(56) References Cited

U.S. PATENT DOCUMENTS

| | | |
|---|---|---|
| 2008/0152974 A1 | 6/2008 | Murabayashi |
| 2010/0201195 A1 | 8/2010 | Maegawa |
| 2010/0254726 A1 | 10/2010 | Endo |
| 2011/0254372 A1* | 10/2011 | Haines et al. .................. 307/66 |
| 2013/0020874 A1* | 1/2013 | Ayotte et al. .................. 307/66 |

FOREIGN PATENT DOCUMENTS

| | | |
|---|---|---|
| CN | 102072606 A | 5/2011 |
| JP | 07-163064 A | 6/1995 |
| JP | 2000-190593 A | 7/2000 |
| JP | 2002-063011 A | 2/2002 |
| JP | 2002-218654 A | 8/2002 |
| JP | 2005-181603 A | 7/2005 |
| JP | 2006-166576 A | 6/2006 |
| JP | 2008-152959 A | 7/2008 |
| JP | 4336318 B2 | 7/2009 |
| JP | 2010-062990 A | 3/2010 |

OTHER PUBLICATIONS

Office Action (Grounds for Rejection) issued on Jul. 22, 2014, by the Chinese Patent Office in corresponding Chinese Patent Application No. 201210336749.4, and an English Translation of the Office Action. (16 pages).

* cited by examiner

FIG.7
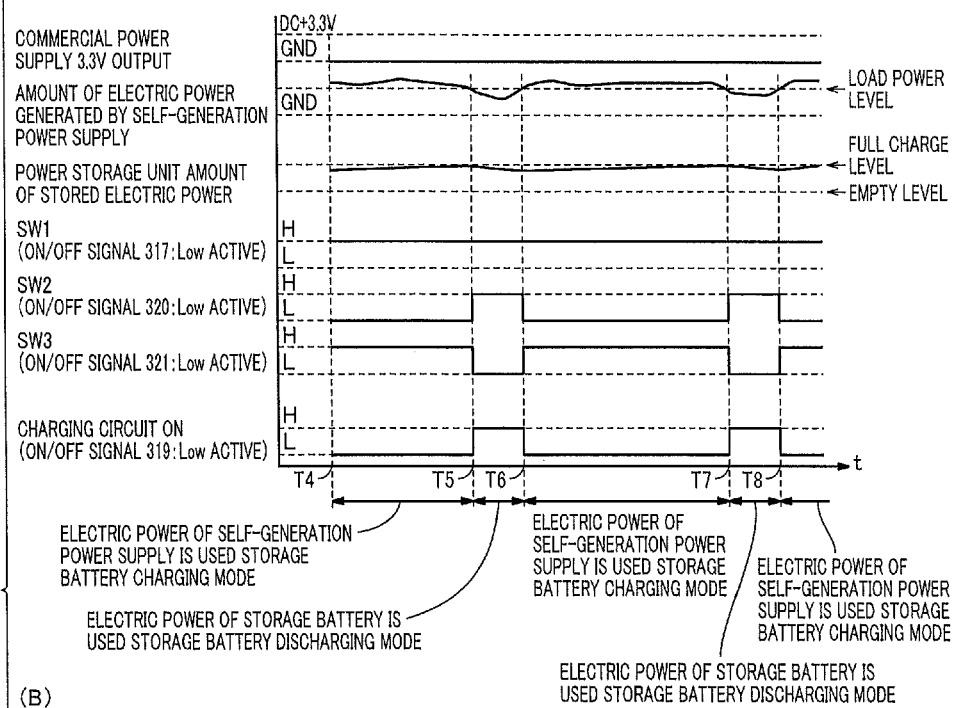
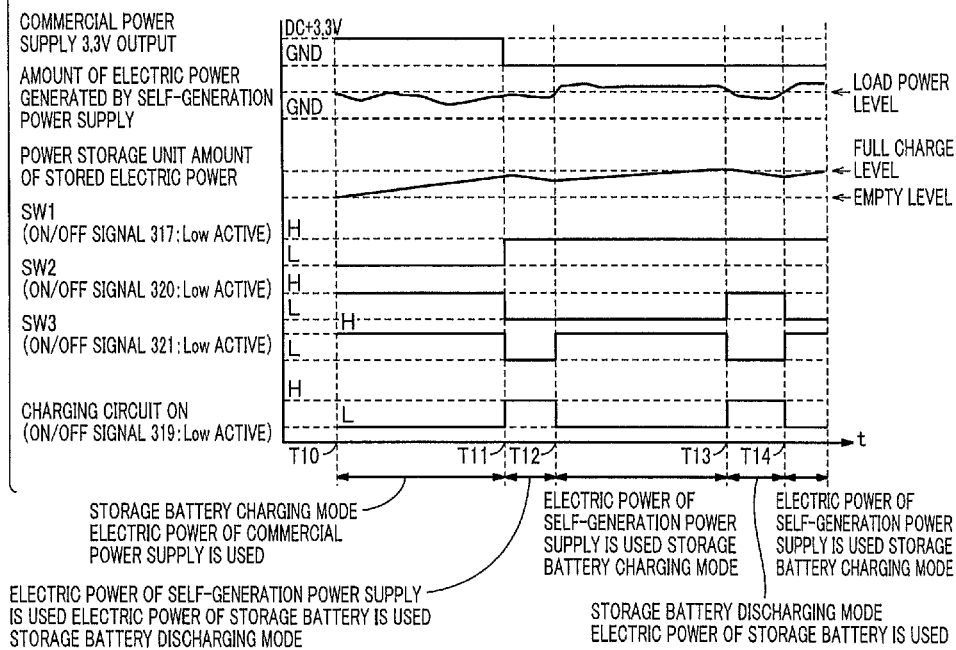

IMAGE FORMING APPARATUS HAVING PLURALITY OF POWER SUPPLIES TO CONTROL POWER PROVIDED FROM A COMMERCIAL POWER SUPPLY

This application is based on Japanese Patent Application No. 2011-201706 filed with the Japan Patent Office on Sep. 15, 2011, the entire content of which is hereby incorporated by reference.

BACKGROUND OF THE INVENTION

1. Field of the Invention

The present invention relates to an image forming apparatus having mounted thereon a power supply device arranged between an external power supply and an electric power load and capable of storing electric power.

2. Description of the Related Art

Conventionally, electronic equipment, such as an electrophotographic image forming apparatus, has a so-called low-power consumption mode in which, when the device has not been used for a certain period even with a main power supply turned on, supply of electric power is temporarily stopped except for a portion of a circuit, such as a control system circuit, to achieve energy saving.

Such electronic equipment has a power supply circuit generating a DC power supply to be supplied to the control system circuit from a commercial AC power supply. Supply of electric power to the control system circuit and the like for which supply of electric power is continued even in the low-power consumption mode is performed by that power supply circuit.

However, the DC power supply supplied from such a power supply circuit in the low-power consumption mode is a high output of about 80% of rated power, for example. It is a portion of the control system circuit for which supply of electric power should actually be continued even in the low-power consumption mode, and about 30% of rated power of the DC power supply at most is required. Therefore, maintaining a high output of about 80% of rated power in the low-power consumption mode will be wasteful from the viewpoint of energy saving, and further energy saving needs to be achieved.

Therefore, Japanese Patent No. 4336318, for example, proposes a system in which a charging unit serving as an auxiliary power supply is provided, and electric power stored in that charging unit is used in the low-power consumption mode, thereby achieving further energy saving.

However, if electric power stored in the charging unit is not enough, a commercial power supply needs to be used.

SUMMARY OF THE INVENTION

An object of the present invention is to provide an image forming apparatus that can achieve further energy saving using another power supply as an auxiliary power supply.

An image forming apparatus according to an aspect of the present invention includes a functional unit executing a function of the image forming apparatus, a first power supply circuit supplying electric power to the functional unit from a commercial power supply, a second power supply circuit including a self-generation power supply and supplying electric power to the functional unit from the self-generation power supply, and a third power supply circuit including a power storage unit storing electric power and a charging circuit charging the power storage unit upon receipt of supply of electric power from at least one of the commercial power supply and the self-generation power supply, the third power supply circuit supplying electric power to the functional unit from the power storage unit. In accordance with an amount of power supply from the self-generation power supply, higher priority is given to supply of electric power to the functional unit from at least one of the second and third power supply circuits than to supply of electric power from the first power supply circuit.

Preferably, when the amount of power supply from the self-generation power supply is larger than or equal to a predetermined value, electric power is supplied to the functional unit from the second power supply circuit.

Preferably, when the amount of power supply from the self-generation power supply is smaller than a first predetermined value and when an amount of power supply stored in the power storage unit is larger than or equal to a second predetermined value, electric power is supplied to the functional unit from the third power supply circuit.

Particularly, when the amount of power supply from the self-generation power supply becomes larger than or equal to the first predetermined value, electric power is supplied to the functional unit from the second power supply circuit upon change from the third power supply circuit.

Preferably, when the amount of power supply from the self-generation power supply is smaller than a first predetermined value and when the amount of power supply stored in the power storage unit is smaller than a second predetermined value, electric power is supplied to the functional unit from the second and third power supply circuits when the value of sum total of both the amounts of power supply is larger than or equal to a third predetermined value.

Particularly, when the amount of power supply from the self-generation power supply is smaller than the first predetermined value and when the amount of power supply stored in the power storage unit is smaller than the second predetermined value, electric power is supplied to the functional unit from the first power supply circuit when a value of sum total of both the amounts of power supply is smaller than the third predetermined value.

Preferably, when supplying electric power to the functional unit from at least one of the second and third power supply circuits upon change from the first power supply circuit, supply of electric power from the first power supply circuit is stopped after supply of electric power to the functional unit from at least one of the second and third power supply circuits is started.

Preferably, the image forming apparatus further includes a detection unit detecting a current and a voltage based on electric power generated by the self-generation power supply, and a control unit calculating the amount of power supply from the self-generation power supply based on a detection result by the detection unit, and controlling the first to third power supply circuits based on a calculation result.

Preferably, the image forming apparatus further includes a detection unit detecting the amount of stored power in the power storage unit, and a control unit calculating the amount of power supply stored in the power storage unit based on a detection result by the detection unit, and controlling the first to third power supply circuits based on a calculation result.

Preferably, the self-generation power supply includes one of a solar battery, a thermoelectric conversion element, a vibration power generation element, and a wireless power generation element.

Preferably, the power storage unit includes one of a secondary battery, a lithium ion capacitor and an electric double layer capacitor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram illustrating changes in voltage level and the like in the low-power consumption mode.

DESCRIPTION OF THE PREFERRED EMBODIMENTS

Figure 1:
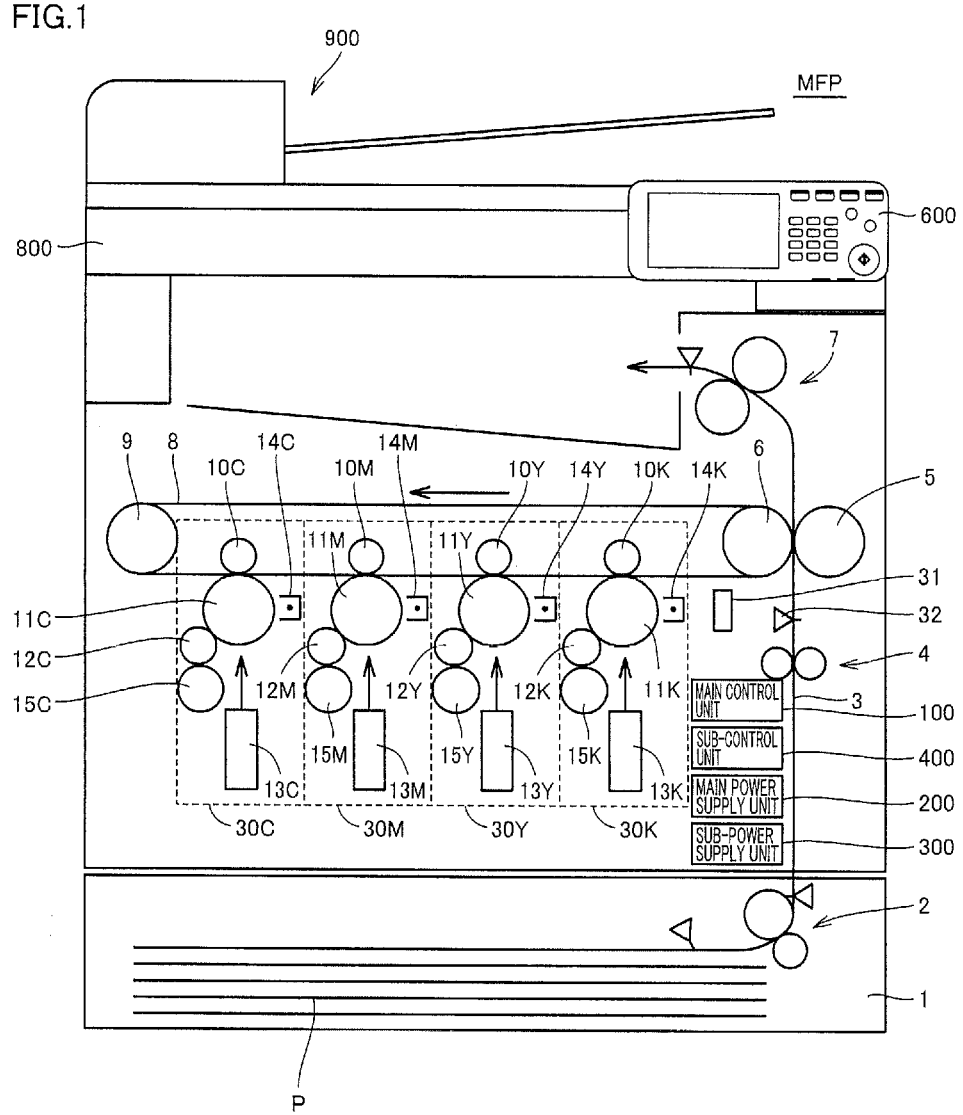
FIG. 1 is a schematic structural diagram of an image forming apparatus MFP according to an embodiment of the present invention.

An embodiment of the present invention will be described in detail with reference to the drawings. It is noted that the same or corresponding portions in the drawings have the same reference characters allotted, and detailed description thereof will not be repeated.

FIG. 1 is a schematic structural diagram of image forming apparatus MFP according to an embodiment of the present invention. In FIG. 1, image forming apparatus MFP with a tandem-type color print engine mounted thereon is illustrated.

Referring to FIG. 1, image forming apparatus MFP has a print engine including main control unit 100, sub-control unit 400, a main power supply unit 200, and a sub-power supply unit 300.

Typically, the print engine forms a color or monochrome image on paper P loaded in a paper feed unit 1 based on image information obtained by a scanner unit 800 optically reading the contents of a document to be printed. An ADF (Auto Document Feeder) 900 is connected to scanner unit 800, and documents to be printed shall be transported sequentially from this ADF 900.

More specifically, the print engine includes process units 30C, 30M, 30Y, and 30K (hereinafter also generically referred to as "process unit 30") for four colors of cyan (C), magenta (M), yellow (Y), and black (K), respectively. Process units 30 for the respective colors are arranged in the moving direction of transfer belt 8, and sequentially form toner images of corresponding colors on transfer belt 8.

Process units 30C, 30M, 30Y, and 30K include primary transfer rollers 10C, 10M, 10Y, and 10K (hereinafter also generically referred to as "primary transfer roller 10"), photoconductors 11C, 11M, 11Y, and 11K (hereinafter also generically referred to as "photoconductor 11"), developing rollers 12C, 12M, 12Y, and 12K (hereinafter also generically referred to as "developing roller 12"), print heads 13C, 13M, 13Y, and 13K (hereinafter also generically referred to as "print head 13"), chargers 14C, 14M, 14Y, and 14K (hereinafter also generically referred to as "charger 14"), and toner units 15C, 15M, 15Y, and 15K (hereinafter also generically referred to as "toner unit 15"), respectively.

Upon receipt of a print request in response to a user's operation on an operation panel 600 (operation panel) or the like, each process unit 30 forms a toner image of each color that constitutes an image to be printed on photoconductor 11, and transfers the formed toner image of each color onto transfer belt 8 with synchronized timing with other process units 30. At this occasion, primary transfer rollers 10 move the toner images on corresponding photoconductors 11 to transfer belt 8.

In each process unit, first, charger 14 charges the surface of photoconductor 11 being rotated, and print head 13 exposes the surface of photoconductor 11 in accordance with image information to be printed. An electrostatic latent image presenting a toner image to be formed is thereby formed on the surface of photoconductor 11. Thereafter, developing roller 12 supplies toner from toner unit 15 to the surface of photoconductor 11, so that the electrostatic latent image is developed as a toner image. Then, primary transfer rollers 10 sequentially transfer the toner images developed on the surface of respective photoconductors 11, onto transfer belt 8 being rotated by a driving motor 9. The toner images of respective colors are overlapped with one another, so that a toner image to be transferred is formed on paper P.

It is noted that the print engine includes a density sensor 31 for detecting the toner density on transfer belt 8 so as to stabilize the density of toner image to be printed.

For image stabilization control through use of density sensor 31, several toner density detection patches printed with development outputs of developers varied and the toner density varied are formed on transfer belt 8. Density sensor 31 then detects the density, and feedback is sent to the development outputs of developers in accordance with the result, so that the toner density which is always stable can be obtained at the time of printing. The image stabilization control can be executed when the main switch of the device is turned on, when a toner cartridge is replaced, when a predetermined number of sheets are printed, and the like.

On the other hand, a feed roller 2 takes out paper P loaded in paper feed unit 1. This paper P taken out is transported along a transport path 3 by means of a transport roller 4, and the like. Then, transport roller 4 keeps paper P waiting at a position when it arrives at a timing sensor 32. Then, transport roller 4 transports paper P to a secondary transfer roller 5 with synchronized timing when a toner image formed on transfer belt 8 arrives at secondary transfer roller 5. That is, paper P is supplied such that the leading end position of paper P and the head of the toner image formed on transfer belt 8 are in alignment.

Then, the toner image on transfer belt 8 is transferred onto paper P by secondary transfer roller 5 and an opposed roller 6. Typically, by applying a predetermined potential (e.g., about +2000 V) corresponding to electric charge the toner image has to secondary transfer roller 5, a force by which the toner image on transfer belt 8 is electrically attracted to secondary transfer roller 5 side occurs. Transfer onto paper P is thereby performed.

Further, the toner image having been transferred onto paper P is heated and pressurized by a fixing unit 7 to be fixed on paper P. Paper P with this toner image fixed thereon is output to a paper discharge tray. A sequential print process is thereby completed.

Main control unit 100 manages the overall processing of print process in the print engine as described above. The details of main control unit 100 will be described later.

Sub-control unit 400 manages power supply to image forming apparatus MFP in the energy saving mode.

Main power supply unit 200 generates various levels of electric power (e.g., DC+5 V, DC+24 V, etc.) to be supplied to each power load constituting image forming apparatus MFP. Part of electric power from main power supply unit 200 is also used for charging a power storage unit. More specifically, main power supply unit 200 includes various regulators not shown for generating DC+5 V.

Sub-power supply unit 300 has a self-generation power supply and a power storage unit storing electric power received from main power supply unit 200 or the self-generation power supply, and supplies the stored electric power to a power load depending on the situation. It is noted that the power storage unit is implemented by a power storage cell, such as a lead acid battery, a nickel hydride battery, a lithium ion battery, a lithium ion capacitor, or an electric double layer capacitor, as an example. A charging voltage for the power storage unit ranges from about 0 V to 4.0 V depending on the type of power storage cell. The self-generation power supply is implemented by a power generation cell, such as a solar battery, a thermoelectric conversion element, a vibration power generation element, or a wireless power generation element, as an example.

It is noted that, in the following description, image forming apparatus MFP shall at least have a mode in which normal image forming processing can be performed (normal mode) and a low-power consumption mode for controlling power consumption (sleep mode and standby mode).

In the normal mode, image forming apparatus MFP according to the present embodiment supplies electric power from a commercial power supply to a power load, and charges the power storage unit. It is noted that, since the self-generation power supply is also provided, the power storage unit can also be charged from that power supply. In the low-power consumption mode, electric power stored in the power storage unit is discharged to supply required electric power to the power load. Alternatively, the self-generation power supply is used to supply required electric power from the power supply to the power load. More specifically, in the low-power consumption mode, the power storage unit and the self-generation power supply function as backup power supplies for image forming apparatus MFP. In this low-power consumption mode, main power supply unit 200 basically stops a power supply operation. More specifically, the switching operation in the regulators of main power supply unit 200 is stopped. By the stop of this power supply operation, switching losses in main power supply unit 200 and the like can be reduced to zero.

In the low-power consumption mode, basically, electric power from sub-power supply unit 300 is used to operate each part. However, when the amount of power supply from sub-power supply unit 300 runs short, power supply at least from main power supply unit 200 is resumed even in the low-power consumption mode. In order to provide such a function, sub-control unit 400 is provided. Sub-control unit 400 closes a relay switch 207 to instruct main power supply unit 200 to resume operating the regulators.

<Overall Control Block Configuration>

Figure 2:
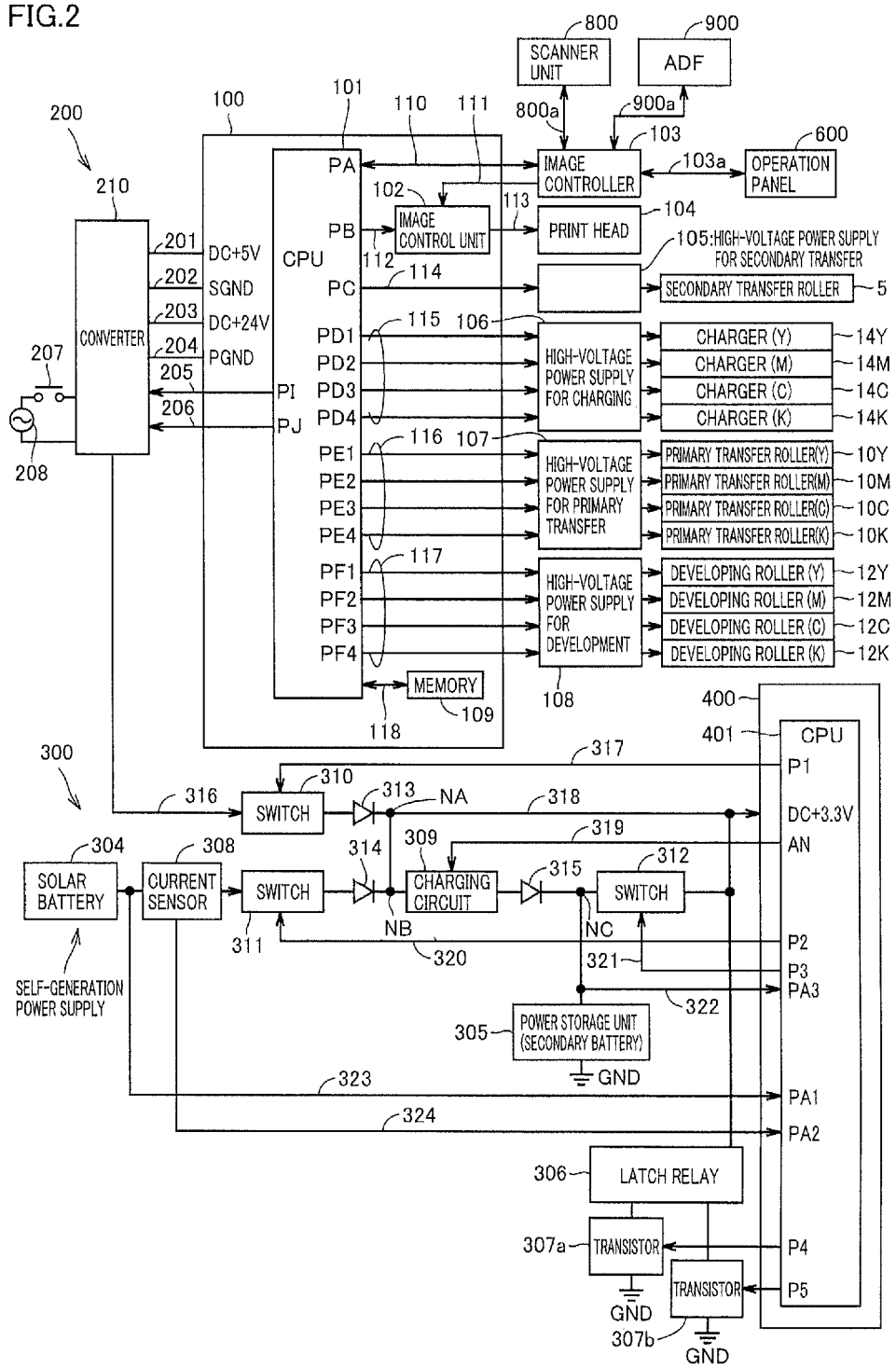
FIG. 2 is a block diagram showing a control configuration according to the embodiment of the present invention.

FIG. 2 is a block diagram showing a control configuration according to the embodiment of the present invention.

Referring to FIG. 2, image forming apparatus MFP according to the present embodiment has main control unit 100 including a CPU (Central Processing Unit) 101 which is a typical example of arithmetic processing unit, as its control configuration. It also has sub-control unit 400 managing power supply to image forming apparatus MFP in the energy saving mode.

First, the power supply function in image forming apparatus MFP will be described.

As shown in FIG. 2, image forming apparatus MFP includes main power supply unit 200 and sub-power supply unit 300 for power supply for driving each power load.

Main power supply unit 200 includes relay switch 207 connected to commercial power supply 208, and a converter 210. Converter 210 is connected to commercial power supply 208 via relay switch 207. Converter 210 converts an AC voltage of commercial power supply 208 into a DC voltage for supply to main control unit 100. Typically, two types of voltage (DC+5V and DC+24V) are supplied. That is, converter 210 of main power supply unit 200 supplies main control unit 100 with DC+5V through a control line 201 and DC+24V through a control line 203. Between converter 210 and main control unit 100, a control line 202 which is a ground line (signal ground: SGND) for control line 201 that supplies DC+5V and a control line 204 which is a ground line (power ground: PGND) for control line 203 that supplies DC+24V are connected.

Main power supply unit 200 also supplies electric power to an image controller 103, a print head 104, operation panel 600, scanner unit 800, and ADF 900 (supply lines thereto are not shown).

Main control unit 100 supplies a DC+24V remote signal to converter 210 via an output port PI of CPU 101 through a control line 205. This DC+24V remote signal is a signal for controlling supply/stop of DC+24V from converter 210 of main power supply unit 200. Typically, in such a case where paper jam occurs in image forming apparatus MFP, where the door of image forming apparatus MFP is opened, where some abnormality occurs in image forming apparatus MFP, or where the low-power consumption mode is attained, the DC+24V remote signal is activated, so that supply of DC+24V from converter 210 is stopped.

Further, main control unit 100 supplies a charge remote signal to converter 210 via an output port PJ of CPU 101 through a control line 206. This charge remote signal is a signal for controlling supply of electric power to sub-power supply unit 300.

Main power supply unit 200 is electrically connected to sub-power supply unit 300 through a power supply line 316, and supplies electric power (a power storage unit charging output) for charging sub-control unit 400 and/or a power storage unit 305. A charging circuit 309 is provided for power storage unit 305, and power storage unit 305 is charged by charging circuit 309. Charging circuit 309 is connected to a positive terminal (+) of power storage unit 305 via a diode 315. Specifically, power storage unit 305 has its positive terminal (+) connected to a node NC. Power storage unit 305 has its negative terminal (−) connected to the ground (GND).

Sub-power supply unit 300 includes a solar battery 304 which is a self-generation power supply, a current sensor 308, switches 310 to 312, diodes 313 to 315, power storage unit 305, a latch relay 306, and transistors 307a, 307b. Sub-power supply unit 300 supplies electric power to sub-control unit 400. It is noted that a description will be made indicating switches 310 to 312 by switches SW1 to SW3 as well.

When an instruction (ON) is sent to transistor 307a through a control line (output port P4) of a CPU 401 of sub-control unit 400, an electromagnetic coil A (not shown) of latch relay 306 having relay switch 207 is energized to thereby perform an operation of opening relay switch 207. When an instruction (ON) is sent to transistor 307b through a control line (output port P5) of CPU 401, an electromagnetic coil B (not shown) of latch relay 306 having relay switch 207 is energized to thereby perform an operation of closing relay switch 207.

It is noted that latch relay 306 has electromagnetic coils A and B, and can execute the opening/closing operation by energizing each electromagnetic coil only for a predetermined time, and can maintain the condition.

Therefore, in the low-power consumption mode, connection with commercial power supply 208 can be disconnected by opening relay switch 207 to attain the energy saving state.

On the other hand, in the normal mode, it is necessary to close relay switch 207 to supply required electric power to main control unit 100. Thus, in the low-power consumption mode, it is configured such that CPU 401 that controls latch relay 306 is always supplied with electric power from power storage unit 305.

In the normal mode, electric power is supplied to main control unit 100 via converter 210 by bringing relay switch 207 into a closed condition by CPU 401 of sub-control unit 400.

Sub-control unit 400 sends an instruction (ON) to switch 310 through a control line 317 connected to an output port P1 of CPU 401 to enable electric power to be supplied from converter 210 to power storage unit 305 of sub-power supply unit 300, and to enable electric power to be supplied to sub-control unit 400 as well.

Power storage unit 305 is charged by subjecting charging circuit 309 to operation ON/OFF control and charging current control in accordance with an analog voltage value through a control line 319 connected to an analog output port AN of CPU 401.

It is noted that the power storage state of power storage unit 305 is detected by an output voltage of power storage unit 305 through a control line 322 connected to an analog input port PA3 of CPU 401.

In the low-power consumption mode, the charging operation for charging circuit 309 is turned off through control line 319 via analog output port AN of CPU 401.

Switch 312 is turned on through a control line 321 connected to an output port P3 of CPU 401, so that electric power from power storage unit 305 is input to a power supply input DC+3.3V of sub-control unit 400. Operating with electric power from power storage unit 305 is thereby possible in the low-power consumption mode.

Conventionally, in the normal mode, converter 210 is operated to perform power supply to the machine, and the charging operation for power storage unit 305 is performed. In the low-power consumption mode, main power supply unit 200 is stopped operating, and electric power from power storage unit 305 is supplied to sub-control unit 400. As to return to the normal mode from the low-power consumption mode, an interruption signal is input to an interruption port (not shown) of CPU 401 of sub-control unit 400 when a user operates operation panel 600 to make a print request to the image controller. Then, in response to the interruption signal, relay switch 207 is closed by CPU 401 to operate converter 210, thereby making return to the normal mode.

As described above, since sub-control unit 400 is conventionally operated by electric power stored in power storage unit 305 using electric power of commercial power supply 208 in the low-power consumption mode, electric power of commercial power supply 208 is consumed with standby electric power. Moreover, it is inefficient to charge power storage unit 305 from commercial power supply 208 via converter 210 and charging circuit 309.

In the embodiment of the present invention, a system having a self-generation power supply (solar battery) and supplying electric power in the low-power consumption mode using commercial power supply 208 as little as possible will be described.

Specifically, as to the amount of electric power generated by the self-generation power supply, the output voltage is monitored via an analog port PA1 of CPU 401 connected to a control line 323, and the current value is monitored by current sensor 308 via an analog port PA2 of CPU 401 connected to a control line 324, so that the amount of electric power generated by the self-generation power supply (solar battery) can be calculated.

In the low-power consumption mode, when the amount of electric power generated by the self-generation power supply (solar battery) exceeds electric power consumed by sub-control unit 400, electric power of the self-generation power supply is applied to sub-control unit 400 independently of the amount of electric power stored in power storage unit 305. Specifically, switch 311 is turned on via an output port P2 of CPU 401 through a control line 320. Electric power is supplied to a DC+3.3V power supply line 318 of sub-control unit 400 via a diode 314. It is noted that a node NA and a node NB of power supply line 318 are electrically coupled.

Further, when the amount of electric power generated by the self-generation power supply (solar battery) is larger, electric power is supplied for charging power storage unit 305. Specifically, switch 311 is turned on to apply power to charging circuit 309 via diode 314, so that power storage unit 305 can be charged via diode 315.

In the low-power consumption mode, when the amount of electric power generated by the self-generation power supply exceeds electric power consumed by sub-control unit 400, switch 311 is turned on to be connected to the cathode of diode 313 via backflow preventing diode 314, thereby feeding power supply line 318 of sub-control unit 400.

Power supply line 316 of 3.3V from converter 210 is connected to power supply line 318 of sub-control unit 400 via switch 310 and backflow preventing diode 313.

The self-generation power supply is connected to power supply line 318 via backflow preventing diode 314. By setting the output voltage from the self-generation power supply, which is supplied to power supply line 318 of sub-control unit 400, at a voltage higher than in converter 210, electric power from the self-generation power supply is used by priority as electric power for sub-control unit 400 and power storage unit 305.

Therefore, by using electric power of the self-generation power supply even in the normal mode, and in the low-power consumption mode, by giving top priority to the self-generation power supply and secondary using electric power stored in power storage unit 305, power consumption of commercial power supply 208 can be minimized to achieve energy saving.

An image forming function in image forming apparatus MFP will now be described.

In image forming apparatus MFP according to the present embodiment, mainly CPU 101, an image control unit 102 and image controller 103 cooperate to provide the image forming function.

Image controller 103 communicates with scanner unit 800 through an interface line (hereinafter also referred to as "I/F line") 800a, and communicates with ADF 900 through an I/F line 900a. Image controller 103 also communicates with operation panel 600 through an I/F line 103a.

Upon receipt of a print request (typically, a document copy request) in response to a user's operation instruction from operation panel 600, image controller 103 gives a control command to scanner unit 800 and/or ADF 900 to read an image of a document (not shown). Image controller 103 temporarily stores the read image data in an image memory (not shown) in the controller.

Alternatively, when a print request and image data are received from an external host computer (not shown) through a network interface (not shown) or the like, image controller 103 also temporarily stores the image data in the image memory (not shown) in the controller.

After temporarily storing the image data in accordance with the processing as described above, image controller 103 sends a print request command to CPU 101 through an I/F line 110 (input/output port PA).

Upon receipt of the print request command from image controller 103, CPU 101 activates a control line 112 (output port PB) to image control unit 102 with predetermined timing. Then, CPU 101 sends the image data stored in image controller 103 to image control unit 102 through control line 112. Then, image control unit 102 sends a control command based on the received image data to print head 104 through control line 113.

Print head 104 controls print heads 13C, 13M, 13Y, and 13K (see FIG. 1) to expose photoconductors 11C, 11M, 11Y, and 11K such that an electrostatic latent image for presenting the received image data is formed.

Image forming apparatus MFP has a high-voltage power supply 105 for secondary transfer, a high-voltage power supply 106 for charging, a high-voltage power supply 107 for primary transfer, and a high-voltage power supply 108 for development. CPU 101 controls these high-voltage power supplies related to the print process through control lines 114, 115, 116, and 117, respectively.

High-voltage power supply 105 for secondary transfer supplies a secondary transfer voltage (about +2000 V) to be applied to secondary transfer roller 5 (FIG. 1). CPU 101 gives a control command through control line 114 (output port PC) to thereby control the value of this secondary transfer voltage.

High-voltage power supply 106 for charging supplies a charging voltage (about −5000 V) to be applied to charger 14 (FIG. 1). CPU 101 gives a control command through control line 115 (output port PD) to thereby control the value of this charging voltage. It is noted that, since chargers are provided in correspondence with process units 30C, 30M, 30Y, and 30K, respectively, four control lines 115 are shown.

High-voltage power supply 107 for primary transfer supplies a primary transfer voltage (about +1000 V) to be applied to primary transfer roller 10 (FIG. 1). CPU 101 gives a control command through control line 116 (output port PC) to thereby control the value of this primary transfer voltage. It is noted that, since primary transfer rollers are provided in correspondence with process units 30C, 30M, 30Y, and 30K, respectively, four control lines 116 are shown.

High-voltage power supply 108 for development supplies a developing voltage to be applied to developing roller 12 (FIG. 1). CPU 101 gives a control command through control line 117 (output port PF) to thereby control the value of this developing voltage. It is noted that, since developing rollers are provided in correspondence with process units 30C, 30M, 30Y, and 30K, respectively, four control lines 117 are shown.

Main control unit 100 includes a memory 109 for holding various settings and various types of information of image forming apparatus MFP in a nonvolatile manner. CPU 101 accesses memory 109 through an I/F line 118.

<Procedure>

The procedure will now be described.

Figure 3:
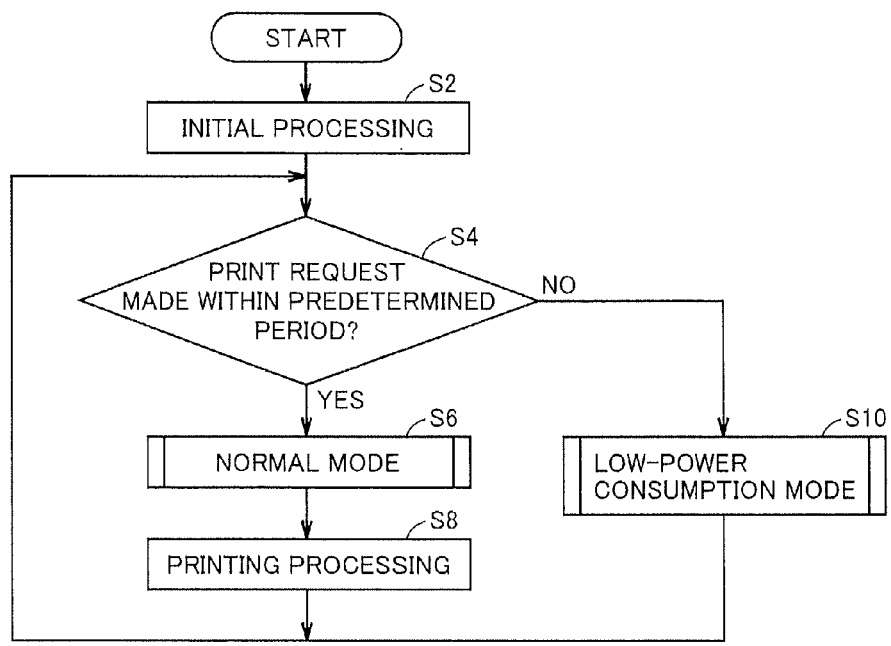
FIG. 3 is a flow chart showing a procedure executed in image forming apparatus MFP according to the embodiment of the present invention.

FIG. 3 is a flowchart showing a procedure executed in image forming apparatus MFP according to the embodiment of the present invention. Each step shown in FIG. 3 is basically provided by CPU 101 executing an instruction code (program) previously stored. However, CPU 401 may execute some steps.

Referring to FIG. 3, initial processing is executed first (Step S2). Specifically, after power-on, initial processing such as warm-up is executed.

After the completion of initial processing such as warm-up, CPU 101 determines whether a print request has been made within a predetermined period (Step S4).

When it is determined in Step S4 that a print request has been made within the predetermined period (YES in Step S4), the normal mode is attained (Step S6). Then, printing processing is executed (Step S8).

On the other hand, when it is determined in Step S4 that a print request has not been made within the predetermined period (NO in Step S4), the low-power consumption mode is attained (Step S10).

Then, the process is returned to Step S4 to repeat the processing.

Processing in the normal mode will now be described.

Figure 4:
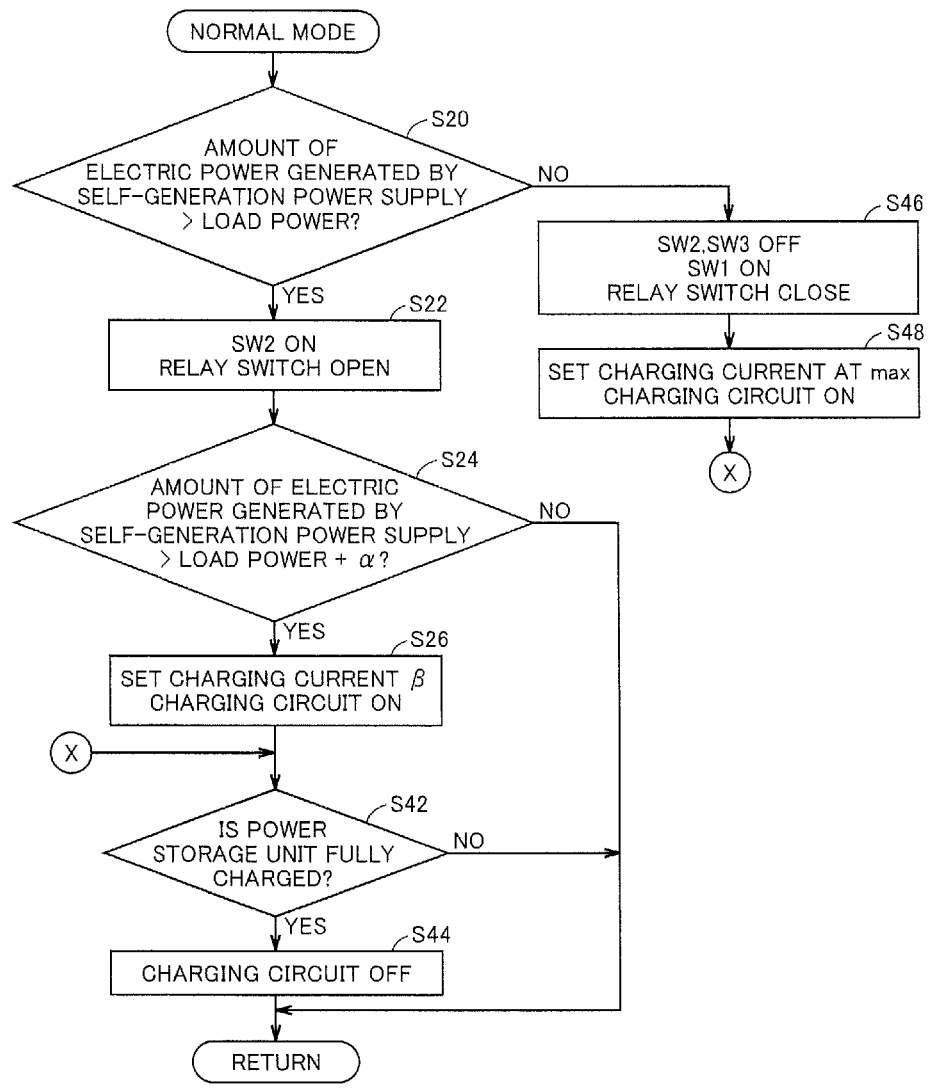
FIG. 4 is a flow chart of controlling a power supply system in a main control unit 100 and a sub-control unit 400 in a normal mode.

FIG. 4 is a flow chart of controlling a power supply system in main control unit 100 and sub-control unit 400 in the normal mode.

Referring to FIG. 4, it is first determined whether the amount of electric power generated by the self-generation power supply is larger than the load power (Step S20). Specifically, the output voltage of self-generation power supply (solar battery) 304 is monitored via analog port PA1 of CPU 401, and the current value is monitored by current sensor 308 via analog port PA2 of CPU 401, thereby calculating the amount of electric power generated by self-generation power supply (solar battery) 304. Then, it is determined whether it exceeds a predetermined threshold value.

When it is determined in Step S20 that the amount of electric power generated by the self-generation power supply is larger than the load power (YES in Step S20), switch 311 (SW2) is turned on. Relay switch 207 is brought into an open condition (Step S22). It is noted that switch 310 (SW1) and switch 312 (SW3) can be turned off. Electric power is thereby supplied to the load from the self-generation power supply.

Next, it is determined whether the amount of electric power generated by the self-generation power supply is larger than the load power plus predetermined power $\alpha$ (Step S24).

When it is determined in Step S24 that the amount of electric power generated by the self-generation power supply is larger than the load power plus predetermined power $\alpha$ (YES in Step S24), a charging current $\beta$ is set, and the charging circuit is turned on (Step S26). Specifically, charging circuit 309 is turned on in accordance with an analog voltage value through the control line (analog output port AN) of CPU 401, and the value of the charging current is set.

Here, it is determined how large the amount of electric power generated by the self-generation power supply is relative to the load power assuming predetermined power as $\alpha$, and in accordance therewith, charging current $\beta$ is set. For example, when the amount of electric power generated by the self-generation power supply is small relative to the load power, charging current $\beta$ is set at a small value. On the other hand, when the amount of electric power generated by the self-generation power supply is large relative to the load power, charging current $\beta$ is set at a large value.

Next, it is determined whether power storage unit 305 is fully charged (Step S42). Specifically, CPU 401 determines the power storage state of power storage unit 305 via analog input port PA3 through control line 322 connected to the +terminal side of power storage unit 305, and determines whether it is fully charged in accordance with the output voltage.

When it is determined in Step S42 that power storage unit 305 is fully charged (YES in Step S42), the charging circuit is turned off (Step S44). Specifically, charging circuit 309 is turned off through the control line (analog output port AN) of CPU 401.

On the other hand, when it is determined in Step S42 that power storage unit 305 is not fully charged (NO in Step S42), Step S44 is skipped to terminate the processing (return). That is, the processing is continued until full charge is attained.

When it is determined in Step S24 that the amount of electric power generated by the self-generation power supply is not larger than the load power plus predetermined power $\alpha$ (NO in Step S24), the processing is terminated (return). In this case, charging circuit 309 is not charged since the amount of electric power generated by the self-generation power supply is not large enough to charge charging circuit 309.

On the other hand, when it is determined in Step S20 that the amount of electric power generated by the self-generation power supply is smaller than the load power (NO in Step S20), switch 311 (SW2) and switch 312 (SW3) are turned off, and switch 310 (SW1) is turned on. Relay switch 207 is brought into the closed condition (Step S46). That is, electric power is supplied to the load from commercial power supply 208.

Then, the charging current is set at a maximum (max), and the charging circuit is turned on (Step S48). Specifically, charging circuit 309 is turned on through the control line (analog output port AN) of CPU 401, and the value of charging current is set at a maximum.

Then, the process proceeds into Step S42. Subsequent processing is similar to that described above.

That is, in the normal mode, the amount of electric power generated by the self-generation power supply is monitored. When the amount of electric power generated by the self-generation power supply is larger than the load power, electric power is supplied to the load from the self-generation power supply. Otherwise, electric power is supplied to the load using the commercial power supply. Therefore, when the amount of electric power generated by the self-generation power supply is large, the commercial power supply is used as little as possible, so that power consumption can be reduced.

When the low-power consumption mode is attained by charging power storage unit 305, electric power can be supplied from power storage unit 305.

Figure 5:
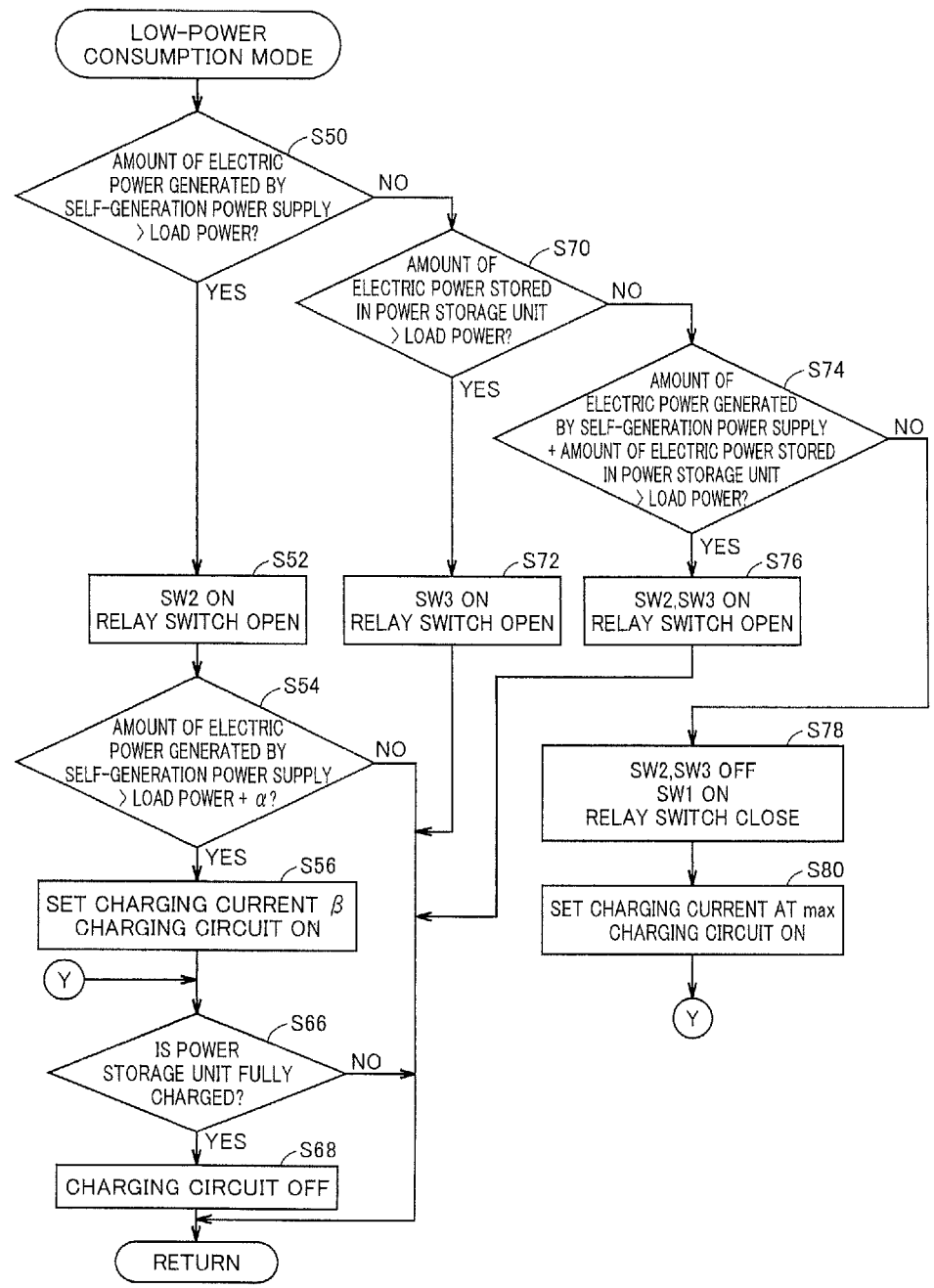
FIG. 5 is a flow chart of controlling the power supply system in main control unit 100 and sub-control unit 400 in a low-power consumption mode.

FIG. 5 is a flow chart of controlling the power supply system in main control unit 100 and sub-control unit 400 in the low-power consumption mode.

Referring to FIG. 5, it is determined first whether the amount of electric power generated by the self-generation power supply is larger than the load power (Step S50). Specifically, the output voltage of self-generation power supply (solar battery) 304 is monitored via analog port PA1 of CPU 401, and the current value is monitored by current sensor 308 via analog port PA2 of CPU 401, thereby calculating the amount of electric power generated by self-generation power supply (solar battery) 304. Then, it is determined whether it exceeds a predetermined threshold value.

When it is determined in Step S50 that the amount of electric power generated by the self-generation power supply is larger than the load power (YES in Step S50), switch 311 (SW2) is turned on. Relay switch 207 is brought into the open condition (Step S52). It is noted that switch 310 (SW1) and switch 312 (SW3) can be turned off. Electric power is thereby supplied to the load from the self-generation power supply.

Next, it is determined whether the amount of electric power generated by the self-generation power supply is larger than the load power plus predetermined power $\alpha$ (Step S54).

When it is determined in Step S54 that the amount of electric power generated by the self-generation power supply is larger than the load power plus predetermined power $\alpha$ (YES in Step S54), charging current $\beta$ is set, and the charging circuit is turned on (Step S56). Specifically, charging circuit 309 is turned on in accordance with an analog voltage value through the control line (analog output port AN) of CPU 401, and the value of the charging current is set.

Here, it is determined how large the amount of electric power generated by the self-generation power supply is relative to the load power assuming predetermined power as $\alpha$, and in accordance therewith, charging current $\beta$ is set. For example, when the amount of electric power generated by the self-generation power supply is small relative to the load power, charging current $\beta$ is set at a small value. On the other hand, when the amount of electric power generated by the self-generation power supply is large relative to the load power, charging current $\beta$ is set at a large value.

Next, it is determined whether the power storage unit is fully charged (Step S66). Specifically, CPU 401 determines the power storage state of power storage unit 305 via analog input port PA3, and determines whether it is fully charged in accordance with the output voltage.

When it is determined in Step S66 that power storage unit 305 is fully charged (YES in Step S66), the charging circuit is turned off (Step S68). Specifically, charging circuit 309 is turned off through the control line (analog output port AN) of CPU 401.

On the other hand, when it is determined that power storage unit 305 is not fully charged (NO in Step S66), Step S68 is skipped to terminate the processing (return). That is, the processing is continued until full charge is attained.

When it is determined in Step S54 that the amount of electric power generated by the self-generation power supply is not larger than the load power plus predetermined power $\alpha$ (NO in Step S54), the processing is terminated (return). In this case, charging circuit 309 is not charged since the amount of electric power generated by the self-generation power supply is not large enough to charge charging circuit 309.

When it is determined in Step S50 that the amount of electric power generated by the self-generation power supply is smaller than the load power (NO in Step S50), it is determined whether the amount of electric power stored in power storage unit 305 is larger than the load power (Step S70). Specifically, CPU 401 determines the power storage state of power storage unit 305 via analog input port PA3, and determines whether it exceeds a predetermined threshold value.

When it is determined in Step S70 that the amount of electric power stored in the power storage unit is larger than the load power (YES in Step S70), switch 312 (SW3) is turned on, and relay switch 207 is brought into the open condition (Step S72). Specifically, electric power is supplied to the load from power storage unit 305. It is noted that switch 311 (SW2) can be turned off in this case.

Then, the processing is terminated (return).

On the other hand, when it is determined in Step S70 that the amount of electric power stored in the power storage unit is smaller than the load power (NO in Step S70), it is determined whether the sum total of the amount of power generated by the self-generation power supply and the amount of electric power stored in the power storage unit is larger than the load power (Step S74).

When it is determined in Step S74 that the sum total of the amount of power generated by the self-generation power supply and the amount of electric power stored in the power storage unit is larger than the load power (YES in Step S74), switch 311 (SW2) and switch 312 (SW3) are turned on, and relay switch 207 is brought into the open condition. Specifically, electric power is supplied to the load from solar battery 304 which is a self-generation power supply and power storage unit 305.

When it is determined in Step S74 that the sum total of the amount of power generated by the self-generation power supply and the amount of electric power stored in the power storage unit is smaller than or equal to the load power (NO in Step S74), switch 311 (SW2) and switch 312 (SW3) are turned off, switch 310 (SW1) is turned on, and relay switch 207 is brought into the closed condition (Step S78). That is, electric power is supplied to the load from commercial power supply 208, rather than from power storage unit 305 and solar battery 304 which is a self-generation power supply.

Then, the charging current is set at a maximum (max), and the charging circuit is turned on (Step S80). Specifically, charging circuit 309 is turned on through the control line (analog output port AN) of CPU 401, and the value of charging current is set at a maximum.

Then, the process proceeds into Step S66. Subsequent processing is similar to that described above.

Figure 6:
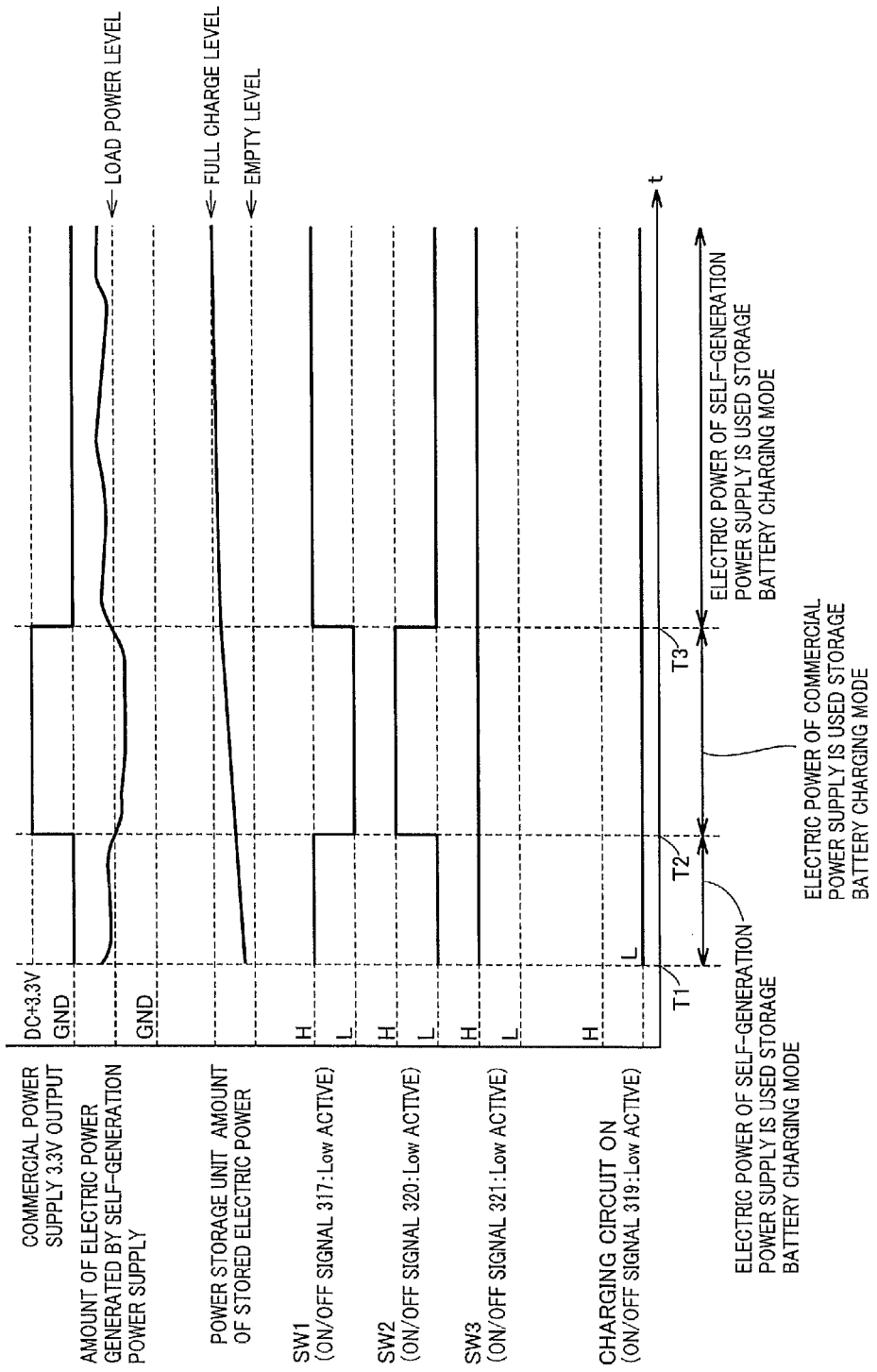
FIG. 6 is a diagram illustrating changes in voltage level and the like in the normal mode.

FIG. 6 is a diagram illustrating changes in voltage level and the like in the normal mode.

Referring to FIG. 6, at time T1, the amount of electric power generated by the self-generation power supply exceeds the load power level. Therefore, switch 310 (SW1) is off, switch 311 (SW2) is on, and switch 312 (SW3) is off. The charging circuit is on.

Therefore, electric power is supplied to the load from solar battery 304 which is a self-generation power supply.

In addition, charging of power storage unit 305 by solar battery 304 which is a self-generation power supply is performed. That is, shown here is the case where charging of power storage unit 305 is performed by the self-generation power supply to increase the amount of stored power.

Next, shown at time T2 is the case where the amount of electric power generated by the self-generation power supply falls below the load power level. Accordingly, switch 310 (SW1) is on, switch 311 (SW2) is off, and switch 312 (SW3) is off. The charging circuit is on. Electric power is thereby supplied to the load from the commercial power supply. It is noted that shown here is the case where charging of power storage unit 305 is performed by the commercial power supply to increase the amount of stored power.

Next, at time T3, the amount of electric power generated by the self-generation power supply exceeds the load power level again. Therefore, switch 310 (SW1) is off, switch 311 (SW2) is on, and switch 312 (SW3) is off. The charging circuit is on. Therefore, electric power is supplied to the load from solar battery 304 which is a self-generation power supply.

Charging of power storage unit 305 is performed by solar battery 304 which is a self-generation power supply. That is, shown here is the case where charging of power storage unit 305 is performed by the self-generation power supply to increase the amount of stored power.

In the normal mode, when the amount of electric power generated by the self-generation power supply is large, the energy saving effect can be increased by using that power supply by priority.

FIG. 7 is a diagram illustrating changes in voltage level and the like in the low-power consumption mode.

Referring to FIG. 7(A), the amount of electric power generated by the self-generation power supply exceeds the load power level at time T4. Therefore, switch 310 (SW1) is off, switch 311 (SW2) is on, and switch 312 (SW3) is off. The charging circuit is on.

Therefore, electric power is supplied to the load from solar battery 304 which is a self-generation power supply. Charging of power storage unit 305 is performed by solar battery 304 which is a self-generation power supply. That is, shown here is the case where charging of power storage unit 305 is performed by the self-generation power supply to increase the amount of stored power.

Next, shown at time T5 is the case where the amount of electric power generated by the self-generation power supply falls below the load power level. Accordingly, switch 310 (SW1) is off, switch 311 (SW2) is off, and switch 312 (SW3) is on. The charging circuit is off. Electric power is thereby supplied to the load from power storage unit 305.

Next, at time T6, the amount of electric power generated by the self-generation power supply exceeds the load power level again. Therefore, switch 310 (SW1) is off, switch 311 (SW2) is on, and switch 312 (SW3) is off. The charging circuit is on. Therefore, electric power is again supplied to the load from solar battery 304 which is a self-generation power supply. Charging of power storage unit 305 is performed by solar battery 304 which is a self-generation power supply. That is, shown here is the case where charging of power storage unit 305 is performed by the self-generation power supply to increase the amount of stored power.

Next, shown at time T7 is the case where the amount of electric power generated by the self-generation power supply falls below the load power level again. Accordingly, switch 310 (SW1) is off, switch 311 (SW2) is off, and switch 312 (SW3) is on. The charging circuit is off. Electric power is thereby supplied to the load from power storage unit 305.

Next, at time T8, the amount of electric power generated by the self-generation power supply exceeds the load power level again. Therefore, switch 310 (SW1) is off, switch 311 (SW2) is on, and switch 312 (SW3) is off. The charging circuit is on. Therefore, electric power is supplied again to the load from solar battery 304 which is a self-generation power supply. Charging of power storage unit 305 is performed by solar battery 304 which is a self-generation power supply. That is, shown here is the case where charging of power storage unit 305 is performed by the self-generation power supply to increase the amount of stored power. It is noted that, when the charging of power storage unit 305 results in the full charge level, the charging circuit is turned off.

Referring to FIG. 7(B), shown at time T10 is the case where the amount of electric power generated by the self-generation power supply falls below the load power level.

Since the amount of stored power in power storage unit 305 is also small, switch 310 (SW1) is on, switch 311 (SW2) is off, and switch 312 (SW3) is off. The charging circuit is on. Electric power is thereby supplied to the load from the commercial power supply.

Next, shown at time T11 is the case where the amount of stored power in power storage unit 305 increases and the sum total of the amount of electric power generated by solar battery 304 which is a self-generation power supply and the amount of electric power stored in power storage unit 305 is larger than the load power. In this case, switch 310 (SW1) is off, switch 311 (SW2) is on, and switch 312 (SW3) is on. The charging circuit is off. Electric power is thereby supplied to the load from power storage unit 305 and solar battery 304 which is a self-generation power supply.

At time T12, the amount of electric power generated by the self-generation power supply exceeds the load power level.

Therefore, switch 310 (SW1) is off, switch 311 (SW2) is on, and switch 312 (SW3) is off. The charging circuit is on.

Therefore, electric power is supplied to the load from solar battery 304 which is a self-generation power supply. Charging of power storage unit 305 is performed by solar battery 304 which is a self-generation power supply. That is, shown here is the case where charging of power storage unit 305 is performed by the self-generation power supply to increase the amount of stored power.

Next, shown at time T13 is the case where the amount of electric power generated by the self-generation power supply falls below the load power level again. Accordingly, switch 310 (SW1) is off, switch 311 (SW2) is off, and switch 312 (SW3) is on. The charging circuit is off. Electric power is thereby supplied to the load from power storage unit 305.

Next, at time T14, the amount of electric power generated by the self-generation power supply exceeds the load power level again. Therefore, switch 310 (SW1) is off, switch 311 (SW2) is on, and switch 312 (SW3) is off. The charging circuit is on. Therefore, electric power is supplied again to the load from solar battery 304 which is a self-generation power supply. Charging of power storage unit 305 is performed by solar battery 304 which is a self-generation power supply. That is, shown here is the case where charging of power storage unit 305 is performed by the self-generation power supply to increase the amount of stored power. It is noted that, when the charging of power storage unit 305 results in the full charge level, the charging circuit is turned off.

Therefore, when the amount of electric power generated by the self-generation power supply is large in the low-power consumption mode, that power supply is used by priority. Specifically, when the amount of electric power generated by the self-generation power supply is larger than the load power, the self-generation power supply is used by priority. Even if the amount of electric power generated by the self-generation power supply is smaller than the load power, electric power is supplied to the load using the power storage unit when the amount of electric power stored in the power storage unit is larger than the load power. Further, even if the amount of electric power stored in the power storage unit is small, electric power is supplied to the load using both the power storage unit and the self-generation power supply when the sum total of the amount of electric power stored in the power storage unit and the amount of electric power generated by the self-generation power supply is larger than the load power. With this processing, the energy saving effect can be increased by using the commercial power supply as little as possible.

It is noted that, although the case of using a solar battery as an example of self-generation power supply has been described, a thermoelectric conversion element, for example, may be provided as the self-generation power supply around a fixing unit so that surplus thermal energy of the fixing unit serving as a heat source is converted into electric power for use. Alternatively, a vibration power generation element, for example, may be provided as the self-generation power supply around a moving part, such as a scanner or a print engine, so that vibration energy of the moving part is converted into electric power for use. Still alternatively, a wireless power generation element, for example, may be provided as the self-generation power supply for a communications device or the like not shown so that wireless energy when wirelessly receiving a job or the like from an external terminal through the communications device is converted into electric power for use.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus, comprising:
   a functional unit executing a function of the image forming apparatus;
   a first power supply circuit supplying electric power to said functional unit from a commercial power supply;
   a second power supply circuit including a self-generation power supply and supplying electric power to said functional unit from said self-generation power supply; and
   a third power supply circuit including a power storage unit storing electric power and a charging circuit charging said power storage unit upon receipt of supply of electric power from at least one of said commercial power supply and said self-generation power supply, said third power supply circuit supplying electric power to said functional unit from said power storage unit,
   wherein in accordance with an amount of power supply from said self-generation power supply, higher priority is given to supply of electric power to said functional unit from at least one of said second and third power supply circuits than to supply of electric power from said first power supply circuit, and
   wherein when the amount of power supply from said self-generation power supply is smaller than a first predetermined value and when the amount of power supply stored in said power storage unit is smaller than a second predetermined value, electric power is supplied to said functional unit from said second and third power supply circuits when the value of a sum total of both the amounts of power supply is larger than or equal to a third predetermined value.

2. The image forming apparatus according to the claim 1, wherein, when the amount of power supply from said self-generation power supply is larger than or equal to a predetermined value, electric power is supplied to said functional unit from said second power supply circuit.

3. The image forming apparatus according to the claim 1, wherein, when the amount of power supply from said self-generation power supply is smaller than a first predetermined value and when an amount of power supply stored in said power storage unit is larger than or equal to a second predetermined value, electric power is supplied to said functional unit from said third power supply circuit.

4. The image forming apparatus according to the claim 3, wherein, when the amount of power supply from said self-generation power supply becomes larger than or equal to the first predetermined value, electric power is supplied to said functional unit from said second power supply circuit upon change from said third power supply circuit.

5. The image forming apparatus according to the claim 1, wherein, when the amount of power supply from said self-generation power supply is smaller than the first predetermined value and when the amount of power supply stored in said power storage unit is smaller than the second predetermined value, electric power is supplied to said functional unit from said first power supply circuit when a value of sum total of both the amounts of power supply is smaller than the third predetermined value.

6. The image forming apparatus according to claim 1, wherein, when supplying electric power to said functional unit from at least one of said second and third power supply circuits upon change from said first power supply circuit, supply of electric power from said first power supply circuit is stopped after supply of electric power to said functional unit from at least one of said second and third power supply circuits is started.

7. The image forming apparatus according to claim 1, further comprising:
   a detection unit detecting a current and a voltage based on electric power generated by said self-generation power supply; and
   a control unit calculating the amount of power supply from said self-generation power supply based on a detection result by said detection unit, and controlling said first to third power supply circuits based on a calculation result.

8. The image forming apparatus according to claim 1, further comprising:
   a detection unit detecting the amount of stored power in said power storage unit; and
   a control unit calculating the amount of power supply stored in said power storage unit based on a detection result by said detection unit, and controlling said first to third power supply circuits based on a calculation result.

9. The image forming apparatus according to claim 1, wherein said self-generation power supply includes one of a solar battery, a thermoelectric conversion element, a vibration power generation element, and a wireless power generation element.

10. The image forming apparatus according to claim 1, wherein said power storage unit includes one of a secondary battery, a lithium ion capacitor and an electric double layer capacitor.

* * * * *